(12) United States Patent
Guidotti et al.

(10) Patent No.: US 8,481,445 B2
(45) Date of Patent: Jul. 9, 2013

(54) MAGNESIUM DICHLORIDE-ALCOHOL ADDUCTS AND CATALYST COMPONENTS OBTAINED THEREFROM

(75) Inventors: Simona Guidotti, Bologna (IT); Dario Liguori, Forino (IT); Giampiero Morini, Padua (IT); Joachim T. M. Pater, Cocomaro di Focomorto (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 13/394,042

(22) PCT Filed: Sep. 3, 2010

(86) PCT No.: PCT/EP2010/062949
§ 371 (c)(1),
(2), (4) Date: Mar. 2, 2012

(87) PCT Pub. No.: WO2011/042269
PCT Pub. Date: Apr. 14, 2011

(65) Prior Publication Data
US 2012/0165483 A1    Jun. 28, 2012

Related U.S. Application Data

(60) Provisional application No. 61/276,979, filed on Sep. 18, 2009.

(30) Foreign Application Priority Data

Sep. 15, 2009    (EP) ..................................... 09170271

(51) Int. Cl.
*B01J 31/00* (2006.01)
*C08F 4/44* (2006.01)
*C08F 2/00* (2006.01)

(52) U.S. Cl.
USPC ............ 502/111; 502/172; 526/142; 526/210

(58) Field of Classification Search
USPC ................... 502/111; 526/142, 210
See application file for complete search history.

(56) References Cited

U.S. PATENT DOCUMENTS

| | | |
|---|---|---|
| 4,399,054 A | 8/1983 | Ferraris |
| 4,499,194 A | 2/1985 | Harada et al. |
| 4,555,497 A | 11/1985 | Coleman, III et al. |

FOREIGN PATENT DOCUMENTS

| | | |
|---|---|---|
| EP | 0395083 | 11/1997 |
| WO | WO-98/44009 | 10/1998 |
| WO | WO-2004085495 | 10/2004 |
| WO | WO-2005/063832 | 7/2005 |
| WO | WO 2005063832 A1 * | 7/2005 |

OTHER PUBLICATIONS

Thushara, et al., "MgCl2×4 (CH3)2CHOH: A New molecular adduct and super active Polymerization Catalyst Support", The Journal of Physical Chemistry C. vol. 113 Apr. 28, 2009, 8556-8559.

* cited by examiner

*Primary Examiner* — David W Wu
*Assistant Examiner* — Elizabeth Eng

(57) ABSTRACT

Solid adducts comprising a $MgCl_2$, ethanol and a compound (A), said compounds being present in molar ratios defined by the following formula $MgCl_2 \cdot (EtOH)_n (A)_p$ in which n is from 0.1 to 6, p ranges from 0.001 to 0.5 and A is a compound selected from cyclic hydrocarbon structures which are substituted with at least two hydroxy groups.

14 Claims, No Drawings

MAGNESIUM DICHLORIDE-ALCOHOL ADDUCTS AND CATALYST COMPONENTS OBTAINED THEREFROM

This application is the U.S. national phase of International Application PCT/EP2010/062949, filed Sep. 3, 2010, claiming priority to European Application 09170271.2 filed Sep. 15, 2009 and the benefit under 35 U.S.C. 119(e) of U.S. Provisional Application No. 61/276,979, filed Sep. 18, 2009; the disclosures of International Application PCT/EP2010/062949, European Application 09170271.2 and U.S. Provisional Application No. 61/276,979, each as filed, are incorporated herein by reference.

The present invention relates to magnesium dichloride/alcohol adducts containing specific amounts of dihydroxy aromatic compounds. The adducts of the present invention are particularly useful as precursors of catalyst components for the polymerization of olefins having increase morphological stability.

$MgCl_2$.alcohol adducts and their use in the preparation of catalyst components for the polymerization of olefins is well known in the art.

Catalyst components for the polymerization of olefins, obtained by reacting $MgCl_2$.nEtOH adducts with halogenated transition metal compounds, are described for example in U.S. Pat. No. 4,399,054. The adduct is prepared by emulsifying the molten adduct in an immiscible dispersing medium and quenching the emulsion in a cooling fluid to collect the adduct in the form of spherical particles.

In WO98/44009 are disclosed $MgCl_2$.alcohol adducts having improved characteristics and characterized by a particular X-ray diffraction spectrum, in which, in the range of 2θ diffraction angles between 5° and 15°, the three main diffraction lines are present at diffraction angles 2θ of 8.8±0.2 °, 9.4±0.2° and 9.8±0.2°, the most intense diffraction lines being the one at 2θ=8.8±0.2°, the intensity of the other two diffraction lines being at least 0.2 times the intensity of the most intense diffraction line. Said adducts can be of formula $MgCl_2$.mEtOH.n$H_2O$.
where m is between 2.2 and 3.8 and n is between 0.01 and 0.6. These adducts are obtained by specific preparation methods involving the reaction between $MgCl_2$ and alcohol under specific conditions such as long reaction times, absence of inert diluents or use of vaporized alcohol. In all the cases, in order to produce a catalytic components a transition metal compound must be fixed on the support. This is obtained by contacting the supports with large amounts of titanium compounds, in particular $TiCl_4$, that causes removal of the alcohol and supportation of Ti atoms. The so obtained catalysts show very high activities but their morphological stability is not always satisfactory because, under polymerization conditions, it often gives rise to a non negligible amount of broken polymer particle that contribute to generate the fine polymer particles which negatively affect the operation of the polymerization plant. As a result also the bulk density of the polymer is lowered which contributes to decrease the productivity of the plant.

WO04/085495 describes magnesium chloride alcohol based supports having formula $MgCl_2.(EtOH)_m(ROH)_n$ adducts in which ROH is an alcohol different from ethanol, n and m are indexes, higher than 0, satisfying the equations $n+m \geqq 0.7$ and $0.05 \leqq n/(n+m) \leqq 0.95$ and with the proviso that when R is methyl and (n+m) is in the range of 0.7 to 1, the value of n/(n+m) ranges from 0.05 to 0.45.

Among the specified alcohols only those having one hydroxy group are mentioned, methanol is preferred. The document clearly describes that the catalyst obtained from the mixed alcohol supports shows an increased polymerization activity but does not provide evidence or suggestion of any effect on the morphological stability.

WO05/063832 describes adducts comprising $MgCl_2$, ethanol and a Lewis base (LB) different from water, said compounds being present in molar ratios defined by the following formula $MgCl_2.(EtOH)_m(LB)_p$ in which n is from 2 to 6 and p has values satisfying the following equation $p/(n+p) \leqq 0.1$.

Preferably, the Lewis base is selected from ethers, esters, and compounds of formula $RX_m$, where R is a hydrocarbon group having from 1 to 20 carbon atoms, X is a —$NH_2$, a —NHR or —OH group and m is 1 or higher. Polyhydroxy compounds having cyclic structure are not mentioned.

The document suggests the use of the Lewis bases to obtain an increased polymerization activity but does not teach any effect on the morphological stability.

The applicant has now surprisingly found that magnesium chloride based adducts having a specific range of alcohol content and containing a specific amount of cyclic polyhydroxy aromatic or aliphatic compounds are able to generate catalyst components with high polymerization activity and enhanced morphological stability.

The present invention therefore relates to solid adducts comprising a $MgCl_2$, ethanol and a polyhydroxy compound (A), said compounds being present in molar ratios defined by the following formula $MgCl_2.(EtOH)_n(A)_p$ in which n is from 0.1 to 6, p ranges from 0.001 to 0.5 and A is a compound selected from cyclic hydrocarbon structures which are substituted with at least two hydroxy groups.

Preferably, the compound (A) is selected from polyhydroxy compound selected from condensed cyclic structures which are formed by at least an aromatic ring and which are substituted with at least two hydroxy groups. In addition to the aromatic ring, the compound A can include saturated rings condensed with the aromatic ones. In this case, preferably the compound A is selected from those in which the hydroxy groups are positioned on an aromatic ring of the di or polycyclic condensed structure. Still more preferably, the compound A comprises only aromatic di or polycyclic structures. Still more preferably it is a dihydroxy naphthalene derivative. It constitutes a preferred aspect of the invention the use of compound A selected from the said condensed cyclic structures in which the hydroxy groups are positioned in such a way that structure has not chelating capability. Preferably, the said hydroxy groups are not adjacent to each other.

In addition to the hydroxy groups, the said cyclic structures, and particularly the condensed cyclic structures, can also be substituted with $R^1$ groups, in which $R^1$ is a C1-C20 hydrocarbon group optionally containing a heteroatom.

For the purpose of the invention a heteroatom means any atom different from carbon and hydrogen. Moreover, the said compound (A) can have more than two hydroxy groups. In this case, at least two hydroxyl groups are positioned on the aromatic ring.

Preferred structures are di or polyhydroxynaphthalenes, di or polyhydroxyfluorenes di or polyhydroxyindenes. Specific preferred compounds are, compounds are 1,5-dihydroxynaphthalene, 1,6-dihydroxynaphthalene, 1,7-dihydroxynaphthalene, 2,6-dihydroxynaphthalene and 2,7-dihydroxynaphthalene.

Preferably, the number of moles of alcohol per mole of $MgCl_2$ ranges from 0.8 to 4 and more preferably from 1 to 3.5. The EtOH/Mg molar ratio from 1.5 to 3 is especially preferred.

The polyhydroxy compound (A) is preferably present in amounts such that p ranges from 0.0015 to 0.5 more preferably from 0.005 to 0.5, and especially from 0.005 to 0.2.

The adduct of the present invention can be prepared according to different techniques. One preferred method comprises bringing into contact the suitable amount of magnesium chloride, polyhydroxy compound (A) and alcohol, heating the system until a molten adduct is formed and then rapidly cooling the system in order to solidify the particles preferably in spherical form.

The contact between magnesium chloride, transition metal compound and alcohol can occur in the presence or in the absence of an inert liquid immiscible with and chemically inert to the molten adduct. If the inert liquid is present it is preferred that the desired amount of alcohol is added in vapour phase. This would ensure a better homogeneity of the formed adduct. The liquid in which the adduct is dispersed can be any liquid immiscible with and chemically inert to the molten adduct. For example, aliphatic, aromatic or cycloaliphatic hydrocarbons can be used as well as silicone oils. Aliphatic hydrocarbons such as vaseline oil are particularly preferred. After the $MgCl_2$ particles, the alcohol and the polyhydroxy compound (A) are dispersed in the liquid phase the mixture is heated at a temperature at which the adduct reaches its molten state. This temperature depends on the composition of the adduct and generally ranges from 100 to 150° C. As mentioned before the temperature is kept at values such that the adduct is completely melted. Preferably, but not necessarily, the adduct is maintained in the molten state under stirring conditions, for a time period equal to or greater than 10 hours, preferably from 10 to 150 hours, more preferably from 20 to 100 hours.

In order to obtain solid discrete particles of the adduct with suitable spherical morphology it is possible to operate in different ways. One of the preferred possibilities is the emulsification of the adduct in a liquid medium which is immiscible with and chemically inert to it followed by the quenching carried out by contacting the emulsion with an inert cooling liquid, thereby obtaining the solidification of the particles of the adduct in spherical form.

Another preferred method for obtaining the solidification of the adduct consists in adopting the spray-cooling technique. When this option is pursued it is preferred that in the first step the magnesium chloride the inorganic compound and the alcohol are contacted to each other in the absence of an inert liquid dispersant. After having been melted the adduct is sprayed, through the use of the proper devices that are commercially available, in an environment having temperature so low as to cause rapid solidification of the particles. In a preferred aspect, the adduct is sprayed in a cold liquid environment and more preferably in a cold liquid hydrocarbon.

Another usable method comprises contacting a ROH alcohol with an already preformed solid $MgCl_2$-ethanol adduct. The contact between the desired amounts of $MgCl_2$-ethanol adduct and the ROH alcohol can be carried out in liquid hydrocarbon medium under stirring conditions. It is also possible to add the ROH alcohol in a vapor phase, and particularly in a loop reactor as described in WO98/44009. It would be particularly preferred to use a $MgCl_2$-ethanol adduct in which part of the ethanol has been removed by physical (for example under a hot nitrogen stream) or chemical dealcoholation.

By way of these methods and in particular of the method comprising the emulsification, it is possible to obtain adduct particles in spherical or spheroidal form. Such spherical particles have a ratio between maximum and minimum diameter lower than 1.5 and preferably lower than 1.3. The adduct of the invention can be obtained in a broad range of average particle size (P50), namely ranging from 1 to 200 μm, preferably from 1 to 150 μm, more preferably from 5 to 100 μm and especially from 10 to 80 microns.

It has been found particularly suitable to have the index p ranging from 0.02 to 0.2 when the average particle size is equal to or higher than 150 μm.

It has been found that independently from the average particle size, the adducts of the invention may show a narrow particle size distribution (PSD) with respect to the adducts in which the polyhydroxy compound (A) is missing. The breath of the PDS can be calculated according to the formula $$\frac{P90 - P10}{P50},$$

wherein P90 is the value of the diameter such that 90% of the total particles have a diameter lower than that value; P10 is the value of the diameter such that 10% of the total particles have a diameter lower than that value and P50 is the value of the diameter such that 50% of the total particles have a diameter lower than that value. It has been found that the adducts of the invention may show PSD lower than 1, preferably in the range 0.5-0.95. Preferably, the adducts obtained according to the general method are further characterized by a DSC profile in which the highest melting temperature (Tm) peak is higher than 95° C., preferably higher than 100° C. and more preferably in the range 105-125° C. and has an associated fusion enthalpy (ΔH) lower than 103 J/gr preferably in the range 70-100 J/g.

The adduct of the invention may also contain some water, preferably in an amount lower than 3% wt. The amount of water can be controlled by paying particular attention to the water content of the reactants. Both $MgCl_2$, and alcohols such as EtOH are in fact highly hygroscopic and tend to incorporate water in their structure. As a result, if the water content of the reactants is relatively high, the final $MgCl_2$-EtOH adducts may contain a too high water content even if water has not been added as a separate component. Means for controlling or lowering the water content in solids or fluids are well known in the art. The water content in $MgCl_2$ can be for example lowered by drying it in an oven at high temperatures or by reacting it with compound which is reactive towards water. As an example, a stream of HCl can be used to remove water from $MgCl_2$. Water from the fluids can be removed by various techniques such as distillation or by allowing the fluids to become in contact with substances capable to subtract water such as molecular sieves. Once this precautions have been taken, the reaction between the magnesium chloride the ethanol and the inorganic compounds to produce the adducts of the invention can be carried out according to the methods reported above.

The adducts of the invention are converted into catalyst components for the polymerization of olefins by reacting them with a transition metal compound of one of the groups IV to VI of the Periodic Table of Elements.

Among transition metal compounds particularly preferred are titanium compounds of formula $Ti(OR)_zX_{y-z}$ in which z is comprised between 0 and y; y is the valence of titanium; X is halogen and R is an alkyl radical having 1-8 carbon atoms or a COR group. Among them, particularly preferred are titanium compounds having at least one Ti-halogen bond such as titanium tetrahalides or halogenalcoholates. Preferred specific titanium compounds are $TiCl_3$, $TiCl_4$, $Ti(OBu)_4$, $Ti(OBu)Cl_3$, $Ti(OBu)_2Cl_2$, $Ti(OBu)_3Cl$. Preferably the reaction is carried out by suspending the adduct in cold $TiCl_4$ (generally 0° C.); then the so obtained mixture is heated up to 80-130° C. and kept at this temperature for 0.5-2 hours. After that the excess of TiCl$_4$ is removed and the solid component is recovered. The treatment with TiCl$_4$ can be carried out one or more times.

The reaction between transition metal compound and the adduct can also be carried out in the presence of an electron donor compound (internal donor) in particular when the preparation of a stereospecific catalyst for the polymerization of olefins is to be prepared. Said electron donor compound can be selected from esters, ethers, amines, silanes and ketones. In particular, the alkyl and aryl esters of mono or polycarboxylic acids such as for example esters of benzoic, phthalic, malonic and succinic acid are preferred. Specific examples of such esters are n-butylphthalate, di-isobutylphthalate, di-n-octylphthalate, diethyl 2,2-diisopropylsuccinate, diethyl 2,2-dicyclohexyl-succinate, ethyl-benzoate and p-ethoxy ethyl-benzoate. Moreover, can be advantageously used also the 1,3 diethers of the formula:

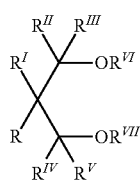

wherein R, R$^I$, R$^{II}$, R$^{III}$, R$^{Iv}$ and R$^V$ equal or different to each other, are hydrogen or hydrocarbon radicals having from 1 to 18 carbon atoms, and R$^{VI}$ and R$^{VII}$, equal or different from each other, have the same meaning of R-R$^V$ except that they cannot be hydrogen; one or more of the R-R$^{VII}$ groups can be linked to form a cycle. The 1,3-diethers in which R$^{VI}$ and R$^{VII}$ are selected from C$_1$-C$_4$ alkyl radicals are particularly preferred.

The electron donor compound is generally present in molar ratio with respect to the magnesium comprised between 1:4 and 1:20.

Preferably, the particles of the solid catalyst components have substantially the same size and morphology as the adducts of the invention generally comprised between 5 and 150 μm.

Before the reaction with the transition metal compound, the adducts of the present invention can also be subjected to a dealcoholation treatment aimed at lowering the alcohol content and increasing the porosity of the adduct itself. The dealcoholation can be carried out according to known methodologies such as those described in EP-A-395083. Depending on the extent of the dealcoholation treatment, partially dealcoholated adducts can be obtained having an alcohol content generally ranging from 0.1 to 2.6 moles of alcohol per mole of MgCl$_2$. After the dealcoholation treatment the adducts are reacted with the transition metal compound, according to the techniques described above, in order to obtain the solid catalyst components.

The solid catalyst components according to the present invention show a surface area (by B.E.T. method) generally between 10 and 500 m$^2$/g and preferably between 20 and 350 m$^2$/g, and a total porosity (by B.E.T. method) higher than 0.15 cm$^3$/g preferably between 0.2 and 0.6 cm$^3$/g.

The amount of the titanium compound in the final catalyst component ranges from 0.1 to 10% wt, preferably from 0.5 to 5% wt.

The catalyst components of the invention form catalysts for the polymerization of alpha-olefins CH$_2$=CHR, wherein R is hydrogen or a hydrocarbon radical having 1-12 carbon atoms, by reaction with Al-alkyl compounds. The alkyl-Al compound can be of the formula AlR$_{3-q}$X$_q$ above, in which R is a C1-C15 hydrocarbon alkyl radical, X is halogen preferably chlorine and q is a number $0 \leq q < 3$. The Al-alkyl compound is preferably chosen among the trialkyl aluminum compounds such as for example trimethylaluminum triethylaluminum, triisobutylaluminum, tri-n-butylaluminum, tri-n-hexylaluminum, tri-n-octylaluminum. It is also possible to use alkylaluminum halides, alkylaluminum hydrides or alkylaluminum sesquichlorides such as AlEt$_2$Cl and Al$_2$Et$_3$Cl$_3$ optionally in mixture with said trialkyl aluminum compounds.

The Al/Ti ratio is higher than 1 and is generally comprised between 20 and 800.

It is possible to use in the polymerization system an electron donor compound (external donor) which can be the same or different from the compound that can be used as internal donor disclosed above. In case the internal donor is an ester of a polycarboxylic acid, in particular a phthalate, the external donor is preferably selected from the silane compounds containing at least a Si—OR link, having the formula R$_a^1$R$_b^2$Si (OR$^3$)$_c$, where a and b are integer from 0 to 2, c is an integer from 1 to 3 and the sum (a+b+c) is 4; R$^1$, R$^2$, and R$^3$, are alkyl, cycloalkyl or aryl radicals with 1-18 carbon atoms. Particularly preferred are the silicon compounds in which a is 1, b is 1, c is 2, at least one of R$^1$ and R$^2$ is selected from branched alkyl, cycloalkyl or aryl groups with 3-10 carbon atoms and R$^3$ is a C$_1$-C$_{10}$ alkyl group, in particular methyl. Examples of such preferred silicon compounds are methylcyclohexyldimethoxysilane, diphenyldimethoxysilane, methyl-t-butyldimethoxysilane, dicyclopentyldimethoxysilane. Moreover, are also preferred the silicon compounds in which a is 0, c is 3, R$^2$ is a branched alkyl or cycloalkyl group and R$^3$ is methyl. Examples of such preferred silicon compounds are cyclohexyltrimethoxysilane, t-butyltrimethoxysilane and hexyltrimethoxysilane.

Also the cyclic ethers such as tetrahydrofurane, and the 1,3 diethers having the previously described formula can be used as external donor.

As previously indicated the catalyst component and catalyst systems obtained from the adducts of the invention are endowed with an enhanced morphological stability which allows to produce polymers, in particular propylene polymers, with a reduced percentage of broken particles and possibly associated higher bulk density. Accordingly, the catalyst systems find applications in the processes for the (co)polymerization of olefins of formula CH$_2$=CHR in which R is hydrogen or a hydrocarbon radical having 1-12 carbon atoms.

The catalysts of the invention can be used in any of the olefin polymerization processes known in the art. They can be used for example in slurry polymerization using as diluent an inert hydrocarbon solvent or bulk polymerization using the liquid monomer (for example propylene) as a reaction medium. Moreover, they can also be used in the polymerization process carried out in gas-phase. The gas-phase process can be carried out in a fluidized or stirred, fixed bed reactor or in a gas-phase reactor comprising two interconnected polymerization zones one of which, working nder fast fluidization conditions and the other in which the polymer flows under the action of gravity.

The polymerization is generally carried out at temperature of from 20 to 120° C., preferably of from 40 to 80° C. When the polymerization is carried out in gas-phase the operating pressure is generally between 0.1 and 10 MPa, preferably between 1 and 5 MPa. In the bulk polymerization the operating pressure is generally between 1 and 6 MPa preferably between 1.5 and 4 MPa.

The catalysts of the invention are very useful for preparing a broad range of polyolefin products. Specific examples of the olefinic polymers which can be prepared are: high density ethylene polymers (HDPE, having a density higher than 0.940 g/cc), comprising ethylene homopolymers and copolymers of ethylene with alpha-olefins having 3-12 carbon atoms; linear low density polyethylenes (LLDPE, having a density lower than 0.940 g/cc) and very low density and ultra low density (VLDPE and ULDPE, having a density lower than 0.920 g/cc, to 0.880 Wee) consisting of copolymers of ethylene with one or more alpha-olefins having from 3 to 12 carbon atoms, having a mole content of units derived from the ethylene higher than 80%; isotactic polypropylenes and crystalline copolymers of propylene and ethylene and/or other alpha-olefins having a content of units derived from propylene higher than 85% by weight; copolymers of propylene and 1-butene having a content of units derived from 1-butene comprised between 1 and 40% by weight; heterophasic copolymers comprising a crystalline polypropylene matrix and an amorphous phase comprising copolymers of propylene with ethylene and or other alpha-olefins.

In particular, it has been noticed that the catalyst components obtained from the said adducts generate during polymerization a very reduced content of broken polymer particles in comparison with the catalyst obtained from adducts not containing the inorganic solid compound. This reduced content of broken polymer particles greatly facilitates the run of the polymerization plants avoiding the formation of fines.

The following examples are given to further illustrate without limiting in any way the invention itself.

Characterization

The properties reported below have been determined according to the following methods:

Fraction Soluble in Xylene.

(XS) The solubility in xylene at 25° C. was determined according to the following method: About 2.5 g of polymer and 250 ml of o-xylene were placed in a round-bottomed flask provided with cooler and a reflux condenser and kept under nitrogen. The mixture obtained was heated to 135° C. and was kept under stirring for about 60 minutes. The final solution was allowed to cool to 25° C. under continuous stirring, and was then filtered. The filtrate was then evaporated in a nitrogen flow at 140° C. to reach a constant weight. The content of said xylene-soluble fraction is expressed as a percentage of the original 2.5 grams.

Average Particle Size of the Adduct and Catalysts

Determined by a method based on the principle of the optical diffraction of monochromatic laser light with the "Malvern Instr. 2600" apparatus. The average size is given as P50.

Average Particle Size of the Polymers

Determined through the use Tyler Testing Sieve Shaker RX-29 Model B available from Combustion Engineering Endecott provided with a set of six sieves, according to ASTM E-11-87, of number 5, 7, 10, 18, 35, and 200 respectively.

Determination of Breakages

The determination of the broken particles percentage was performed on a representative sample of the whole polymer, by manual separation of the broken particles from those spherical, giving the percentage expression (weight) of the broken polymer fraction. By "broken" we mean those particles which look like a half-sphere shape, flakes, etc. characterized by sharp edge angles, peels, fragments. The presence of non-spherical particles, not ascribed to a clear breakage of the spherical particles but resulting from non-spherical catalyst particles, was not calculated as breakage.

A representative portion of the sample (4-7 g) was poured into a tray, in a single layer. The tray was gradually tilted to form a sloped plane to promote flowing and separation of the spherical particles from the broken particles. The percentage of broken particles was calculated, and reported in the tables below.

Propylene Polymerization Test

A 4-liter steel autoclave equipped with a stirrer, pressure gauge, thermometer, catalyst feeding system, monomer feeding lines and thermostating jacket, was purged with nitrogen flow at 70° C. for one hour. Then it was charged at 30° C. under propylene flow with 75 ml of anhydrous hexane, 0.76 g of $AlEt_3$, 0.076 g of dicyclopentyldimethoxysilane and 0.005-0.010 g of solid catalyst component. The autoclave was closed; subsequently 2.0 Nl of hydrogen were added. Then, under stirring, 1.2 Kg of liquid propylene was fed. The temperature was raised to 70.degree. C. in five minutes and the polymerization was carried out at this temperature for two hours. At the end of the polymerization, the non-reacted propylene was removed; the polymer was recovered and dried at 70° C. under vacuum for three hours.

Determination of Polyhydroxy Compound A

The determination of compound A in the solid adducts has been carried out using standard NMR technique.

$^1H$ NMR spectra of the solid adducts were obtained using a Bruker AV200 spectrometer operating in the Fourier transform mode at room temperature at 200.13 MHz. As NMR solvent was used acetone-$d_6$. The residual peak of acetone-$d_6$ appears as a quintet, is centred at 2.05 ppm and was used as reference for $^1H$ NMR spectra. Chemical shifts are quoted in ppm relative to tetramethylsilane.

All operations were performed under nitrogen by using conventional Schlenk-line techniques. The samples, 20-100 mg of solid adducts, were prepared by analytically weighing in a 5 mm NMR tube, adding 0.5-0.6 ml of acetone-$d_6$ as solvent and a defined amount of a suitable internal standard (e.g. hexamethylbenzene). The amount of compound A present in the solid adduct was determined by the molar ratio between the internal standard added and the compound A. The molar ratio was calculated from the normalized 1H intensity peak of the aromatic portion of compound A (in the range 6.5-8.5 ppm) and the intensity of the characteristic peak of the internal standard added (e.g. ca. 2.15 ppm for hexamethylbenzene).

As cross check, the same calculation was made for the —$CH_2$— peak of the ethoxylic group related to ethanol of solid adduct versus the peak of the internal standard. The amount of ethoxylic group found resulted to be in good agreement with the amount found by classic gas-chromatography analysis.

EXAMPLES

Examples 1-9 and Comparative 1

Preparation of the Solid Adduct

In a 0.4-liter jacketed reactor, equipped with mechanical stirrer, cooler, thermometer and two baffles 15.2 g of magnesium chloride, 0.13 g of 1,5-dihydroxynaphthalene and 75 ml of mineral oil OB/22-AT were fed at room temperature under nitrogen atmosphere. Then 29.8 ml of anhydrous ethanol were slowly introduced under stirring, observing a temperature increase up to ca. 50° C. When the ethanol addition was completed, the temperature was raised up to 125° C. and kept at this value for 2 hours. During this stage, stirring was maintained at about 1200 rpm in order to have the optimal mass exchange conditions, without loss of ethanol. After the melt maturation, additional 175 ml of pre-heated mineral oil OB/22-AT were added at 125° C. Subsequently, at this temperature, the emulsion was stirred at about 1800 rpm for 30 minutes; then it was transferred into a 2.0-liter quencher/crystallizer, equipped with a thermometer and a mechanical stirrer, and containing 1270 ml of hexane at ca. 0° C., which was kept under stirring during the addition. The final temperature resulting from the mixing of hot oil/melt emulsion and the hexane did not exceed 20° C. At the end of the transfer, the mixture was kept for 2 h at 15° C. and for 2 h at 20° C. under stirring. After overnight resting at room temperature, the mixture underwent additional stirring for 6 h at 25° C.; then the solid particles of the adduct recovered were washed three times with hexane at room temperature in order to remove the residual mineral oil (hexane/solid adduct ca.10/1 v./wt.). The hexane slurry was then transferred in a round bottom flask for drying under vacuum (150 mmHg/2÷3 h) avoiding overheating of the solid adduct close to the flask walls. The slurry was gently moved until the spherical support was free flowing. The solid adduct was analyzed and results are reported in Table 1.

Preparation of the Solid Catalyst Component

Into a 0.5-liter round bottom flask, equipped with mechanical stirrer, cooler and thermometer 305 ml of $TiCl_4$ were introduced at room temperature under nitrogen atmosphere. After cooling at 0° C., while stirring, 9.1 g of a solid adduct comprising $MgCl_2$, ethanol and the polyhydroxy compound (A) were added. The temperature was then raised from 0° C. up to 40° C. at a speed of 0.4° C./min. When the temperature of 40° C. was reached, diisobutylphthalate (DIBP) as internal donor was introduced in the specific amount aiming to have an Mg/donor molar ratio of 8. At the end of the addition, the temperature was increased up to 100° C. at a speed of 0.8° C./min and maintained fixed at this value for 120 minutes. Thereafter, stirring was stopped, the solid product was allowed to settle and the supernatant liquid was siphoned off maintaining the temperature at 100° C. After the supernatant was removed, additional 305 ml of $TiCl_4$ were added. The mixture was then heated at 120° C. and kept at this temperature for 30 minutes. Once again the stirring was interrupted; the supernatant liquid was siphoned off and separated from the settled solid maintaining the temperature at 120° C. A third aliquot (305 ml) of $TiCl_4$ was added and the reaction mixture kept at 120° C. for 30 minutes. Finally $TiCl_4$ was removed; the solid was washed six times with anhydrous hexane, then dried under vacuum and analyzed. The final catalyst composition is reported in Table 1. The catalyst was used in the polymerization of propylene according to the general procedure. The results are also reported in Table 1.

Examples 10-12 and Comparative 2

Dealcoholation of the Solid Adduct

Into a 500 ml round bottom flask were introduced at room temperature under nitrogen atmosphere 15.4 g of a spherical adduct produced in Examples above. The starting adduct used for dealcoholation is indicated in Table 2. The lowering of the support ethanol content (dealcoholation) was performed under static circumstances at the following operative conditions: 35° C./0.5 h, 40° C./2 h, 45° C./2 h, 50° C./3 h under vacuum (between 0.5 and 5 mmHg). The degree of de-alcoholation was checked by frequent weighing the sample. Final solid adduct was analyzed and results are reported in Table 2.

Preparation of the Solid Catalyst Component

The solid adducts described in examples 10-12 and in Comparative example 2 were converted into solid catalysts components by following the same procedure reported above the solid adducts of examples 1-9 and in comparative example 1. The final catalysts compositions are reported in Table 2. The catalysts were used in the polymerization of propylene according to the general procedure. The results are also reported in Table 2.

Example 13

A solid adduct was prepared according to the procedure described for Example 1, using 1,6-dihydroxynaphthalene as cyclic polyhydroxy compound instead of 1,5-dihydroxynaphthalene. Subsequently, the obtained solid adduct was partially dealcoholated using the procedure described for Example 10. The relative composition and morphology data are reported in Table 2. The catalyst was used in the polymerization of propylene according to the general procedure. The results are also reported in Table 2.

Example 14

A solid adduct was prepared according to the procedure described for Example 1, using 2,7-dihydroxynaphthalene as cyclic polyhydroxy compound instead of 1,5-dihydroxynaphthalene. Subsequently, the obtained solid adduct was partially dealcoholated using the procedure described for Example 10. The relative composition and morphology data are reported in Table 2. The catalyst was used in the polymerization of propylene according to the general procedure. The results are also reported in Table 2.

TABLE 1

Solid Adduct

| | Preparation | | Characterization | | | |
|---|---|---|---|---|---|---|
| Example n° | A Type | A/Mg % mol | A/Mg (NMR) (m.r.) | EtOH/Mg (m.r.) | P50 μm | Span |
| Comp. 1 | — | 0 | 0 | 3.0 | 171 | 1.1 |
| 1 | 1,5-DHN | 0.5 | 0.001. | 3.0 | 107 | 0.9 |
| 2 | 1,5-DHN | 1.0 | 0.002 | 3.1 | 111 | 0.9 |
| 3 | 1,5-DHN | 1.0 | 0.007 | 2.9 | 173 | 0.7 |
| 4 | 1,5-DHN | 1.5 | 0.010 | 3.0 | 109 | 0.8 |
| 5 | 1,5-DHN | 1.5 | 0.012 | 3.2 | 111 | 0.8 |
| 6 | 1,5-DHN | 2.0 | 0.014 | 3.3 | 125 | 0.8 |
| 7 | 1,5-DHN | 3.0 | 0.016 | 2.8 | 94 | 1.1 |
| 8 | 1,5-DHN | 5.0 | 0.037 | 2.9 | 183 | 0.7 |
| 9 | 1,7-DHN | 1.5 | 0.007 | 2.9 | 192 | 0.7 |

| | Solid Catalyst Component | | | | | Polymerization | | |
|---|---|---|---|---|---|---|---|---|
| Example n° | Mg % wt | Ti % wt | DIBP % wt | P50 μm | Span | Yield Kg/g | XI % wt | % breakages |
| Comp. 1 | 18.4 | 3.1 | 12.9 | 128 | 0.9 | 89 | 97.9 | 94 |
| 1 | 18.9 | 3.1 | 9.9 | 90 | 0.8 | 88 | 97.6 | 13 |
| 2 | 19.0 | 3.0 | 10.0 | 86 | 0.9 | 89 | 98.0 | 32 |
| 3 | 18.8 | 3.0 | 11.0 | 150 | 0.7 | 90 | 97.7 | 71 |
| 4 | 18.9 | 3.1 | 9.0 | 91 | 0.7 | 89 | 97.9 | 14 |
| 5 | 19.0 | 3.0 | 9.4 | 84 | 0.9 | 92 | 98.0 | 24 |
| 6 | 19.1 | 2.9 | 10.5 | 90 | 1.0 | 86 | 98.3 | 21 |
| 7 | 18.8 | 3.0 | 9.5 | 79 | 0.9 | 91 | 98.2 | 37 |
| 8 | 18.9 | 3.0 | 9.0 | 151 | 0.7 | 80 | 97.7 | 36 |
| 9 | 18.8 | 3.1 | 10.4 | 156 | 0.9 | 90 | 98.0 | 63 | n.d. = not determined

TABLE 2

| | Solid Adduct | | | | | |
|---|---|---|---|---|---|---|
| Preparation | | | Characterization | | | |
| Example n° | Example Adduct n° | A Type | A/Mg % mol | A/Mg (NMR) (m.r.) | EtOH/Mg (m.r.) | P50 µm |
| Comp. 2 | Comp. 1 | — | 0 | 0 | 2.0 | 188 |
| 10 | 2 | 1,5-DHN | 1.0 | 0.003 | 2.4 | 159 |
| 11 | 4 | 1,5-DHN | 1.5 | 0.010 | 2.4 | 102 |
| 12 | 5 | 1,5-DHN | 1.5 | 0.012 | 1.9 | 118 |
| 13 | — | 1,6-DHN | 1.5 | 0.007 | 2.1 | 173 |
| 14 | — | 2,7-DHN | 1.5 | 0.007 | 1.6 | 184 |

| | Solid Catalyst Component | | | | | Polymerization | | |
|---|---|---|---|---|---|---|---|---|
| Ex. n° | Span | Mg % wt | Ti % wt | DIBP % wt | P50 µm | Span | Yield Kg/g | XI % wt | % breakages |
| Comp. 2 | 1.0 | 18.6 | 2.5 | 10.0 | 135 | 1.2 | 57 | 98.1 | 78 |
| 10 | 0.7 | 19.7 | 2.7 | 7.8 | 140 | 0.6 | 79 | 97.9 | 10 |
| 11 | 0.8 | 18.9 | 3.0 | 9.3 | 93 | 0.7 | 86 | 98.0 | 9 |
| 12 | 0.8 | 19.6 | 2.5 | 8.0 | 108 | 0.7 | 63 | 98.1 | 23 |
| 13 | 0.9 | 19.4 | 2.7 | 9.3 | 185 | 0.8 | 63 | 98.4 | 23 |
| 14 | 0.9 | 19.2 | 2.6 | 9.4 | 167 | 1.0 | 50 | 98.0 | 29 | n.d. = not determined

The invention claimed is:

1. Solid adducts comprising $MgCl_2$, ethanol and a polyhydroxy compound A, wherein said $MgCl_2$, ethanol, and polyhydroxy compound A are present in the solid adducts in molar ratios defined by the formula $MgCl_2 \cdot (EtOH)_n(A)_p$, wherein n is from 0.1 to 6, p ranges from 0.001 to 0.5 and A is a polyhydroxy compound selected from condensed cyclic structures which are formed by at least an aromatic ring and which are substituted with at least two hydroxy groups.

2. The solid adducts according to claim 1, wherein the compound A consists of aromatic di or polycyclic structures.

3. The solid adducts according to claim 1, wherein the compound A is a dihydroxy naphthalene derivative.

4. The solid adducts according to claim 1, wherein the compound A is selected from said condensed cyclic structures in which the hydroxy groups are positioned in such a way that the structure does not have chelating capability.

5. The solid adducts according to claim 1, wherein the compound A is selected from di or polyhydroxynaphthalenes, di or polyhydroxyfluorenes, or di or polyhydroxyindenes.

6. The solid adducts according to claim 1 wherein the compound A is selected from the group consisting of 1,5-dihydroxynaphthalene, 1,6-dihydroxynaphthalene, 1,7-dihydroxynaphthalene, 2,6-dihydroxynaphthalene 2,7-dihydroxynaphthalene, and 2,3-dihydroxynaphthalene.

7. The solid adducts according to claim 1, wherein the ROH/Mg molar ratio is from 1.5 to 3.

8. The solid adducts according to claim 1, wherein the polyhydroxy compound A is present in amounts such that p ranges from 0.0015 to 0.5.

9. The solid adducts according to claim 1, wherein when the average particle size is equal to or higher than 150 µm, the index p ranges from 0.02 to 0.2.

10. Catalyst components for the polymerization of olefins obtained by reacting the solid adducts according to claim 1 with a transition metal compound of one of the groups IV to VI of the Periodic Table of Elements.

11. The catalyst components according to claim 10 wherein the transition metal compound is selected from titanium compounds of the formula $Ti(OR)_nX_{y-n}$ wherein n is comprised between 0 and y; y is the valence of titanium; X is a halogen and R is independently selected from an alkyl radical having 1-8 carbon atoms or a COR' group wherein R' is an alkyl radical having 1-8 carbon atoms.

12. The catalyst components according to claim 10 wherein the reaction between the transition metal compound and the adduct is also carried out in the presence of an electron donor compound (internal donor).

13. A catalyst system for the polymerization of olefins obtained by reacting (a) a solid catalyst component according to claim 10, (b) an Al-alkyl compound and optionally, (c) an external electron donor.

14. A process for the polymerization of olefins comprising the step of polymerizing an olefin in the presence of the catalyst system according to claim 13.

* * * * *